United States Patent [19]

McMahan

[11] Patent Number: 5,516,073
[45] Date of Patent: May 14, 1996

[54] VEHICLE OUTSIDE MIRROR ATTACHING ARRANGEMENT

[75] Inventor: James S. McMahan, Walled Lake, Mich.

[73] Assignee: Chrysler Corporation, Auburn Hills, Mich.

[21] Appl. No.: 368,441

[22] Filed: Jan. 4, 1995

[51] Int. Cl.⁶ ..................................... A47G 1/16
[52] U.S. Cl. ..................... 248/486; 248/549; 248/289.11
[58] Field of Search ..................... 248/479, 477, 248/478, 549, 289.11, 486, 282, 284; 359/871, 872, 844, 881

[56] References Cited

U.S. PATENT DOCUMENTS

| | | | |
|---|---|---|---|
| 1,110,973 | 9/1914 | Tischler | 248/486 |
| 1,797,037 | 3/1931 | Wolff | 248/282.1 |
| 1,812,744 | 6/1931 | Glenn | 248/282.1 |
| 2,608,926 | 9/1952 | Helsley | 98/2 |
| 2,679,201 | 5/1954 | Scharmen | 98/2 |
| 3,096,061 | 7/1963 | Bertell | 248/288 |
| 3,120,369 | 2/1964 | Gray, Jr. | 248/223 |
| 3,131,251 | 4/1964 | Ryan | 88/98 |
| 3,371,903 | 3/1968 | Thompson | 248/486 |
| 3,906,592 | 9/1975 | Sakasegawa et al. | 24/73 |
| 4,165,156 | 8/1979 | O'Connell | 248/486 |
| 4,212,303 | 7/1980 | Nolan | 128/346 |
| 4,500,063 | 2/1985 | Schmidt et al. | 248/475 |
| 4,609,171 | 9/1986 | Matsui | 248/74.3 |
| 4,892,400 | 1/1990 | Brookes et al. | 350/626 |
| 4,898,458 | 2/1990 | McDonald | 350/584 |
| 5,106,049 | 4/1992 | Schmidt et al. | 248/487 |
| 5,137,247 | 8/1992 | Lang | 248/549 |
| 5,210,655 | 5/1993 | Mishali | 359/850 |
| 5,292,100 | 3/1994 | Byers et al. | 248/480 |
| 5,301,916 | 4/1994 | Schmidt et al. | 248/475 |
| 5,316,257 | 5/1994 | Schmidt et al. | 248/487 |
| 5,332,186 | 7/1994 | Lutz | 248/549 |

Primary Examiner—Karen J. Chotkowski
Assistant Examiner—Gwendolyn Wrenn
Attorney, Agent, or Firm—Thomas G. Pasternak

[57] ABSTRACT

An alternative mounting bracket arrangement for an exterior rear view mirror assembly which is normally supported by a door-half hinge plate of a vehicle removable front door. With the door removed the bracket may be readily bolted to an open knuckle of the body-half hinge plate. The bracket has upper and lower apertured flanges, vertically spaced for receiving the knuckle therebetween, with each flange formed with matching body engaging notch means. Upon insertion of an attaching bolt through the flange apertures the bracket is secured at a determined orientation.

6 Claims, 3 Drawing Sheets

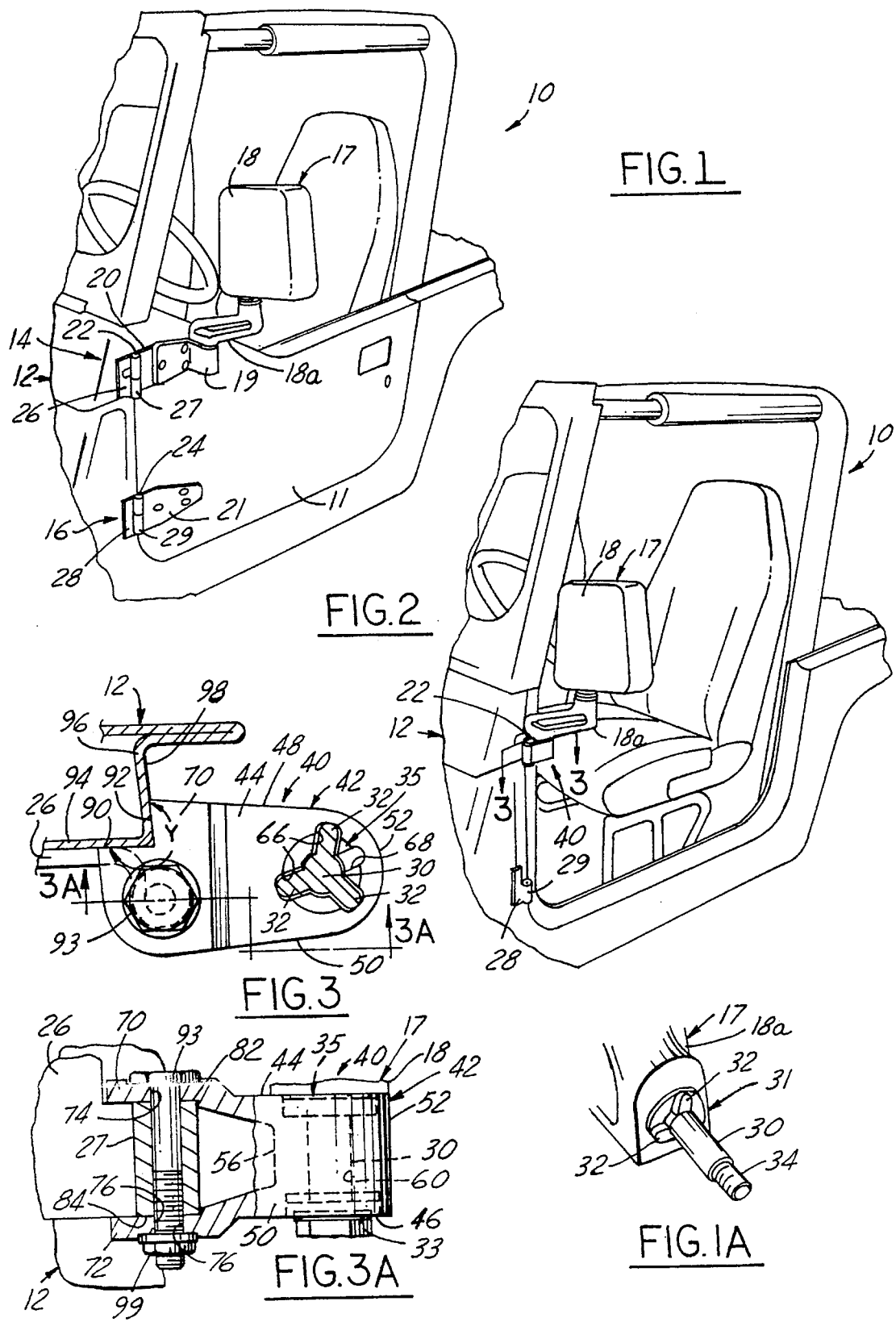

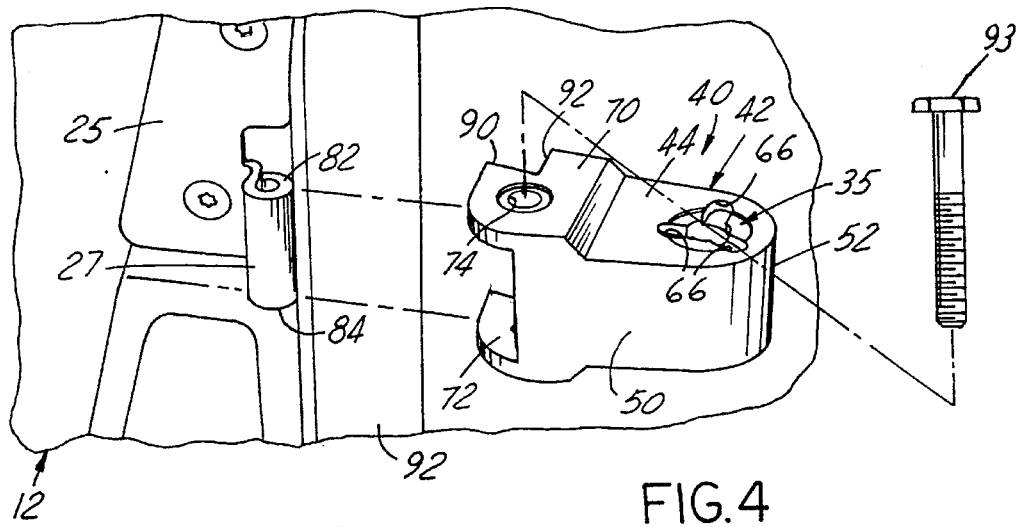
FIG.4
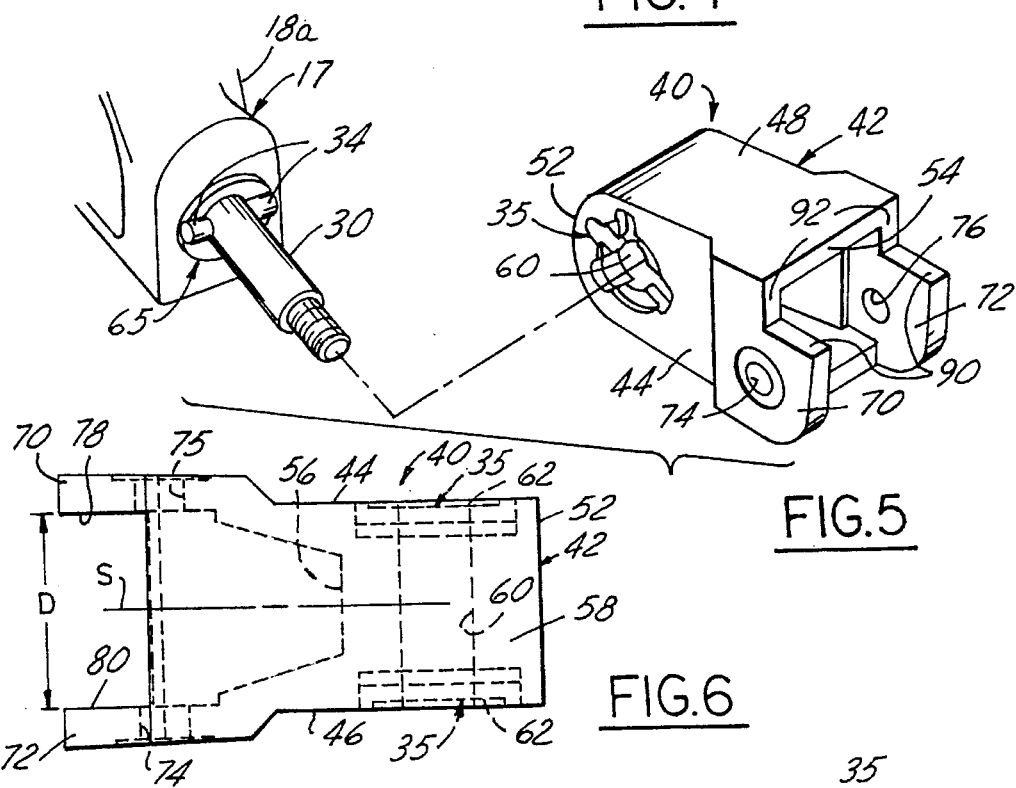
FIG.5
FIG.6
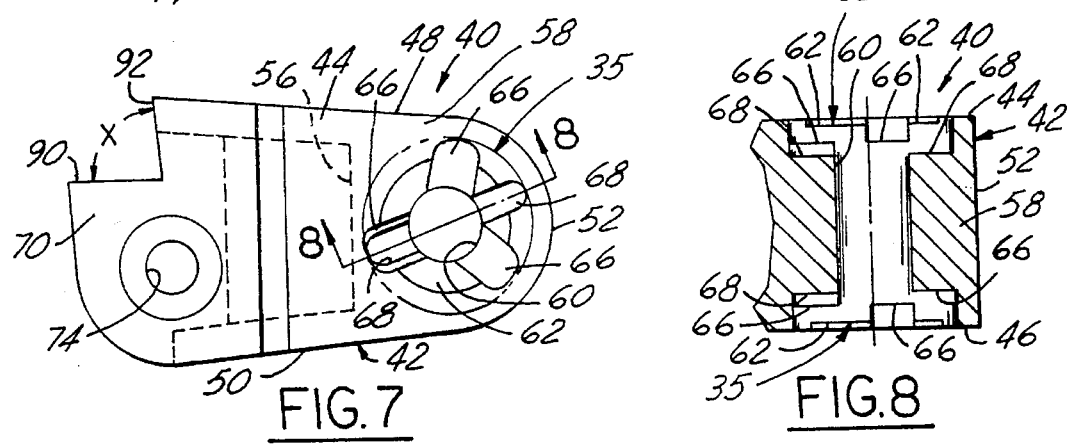
FIG.7
FIG.8

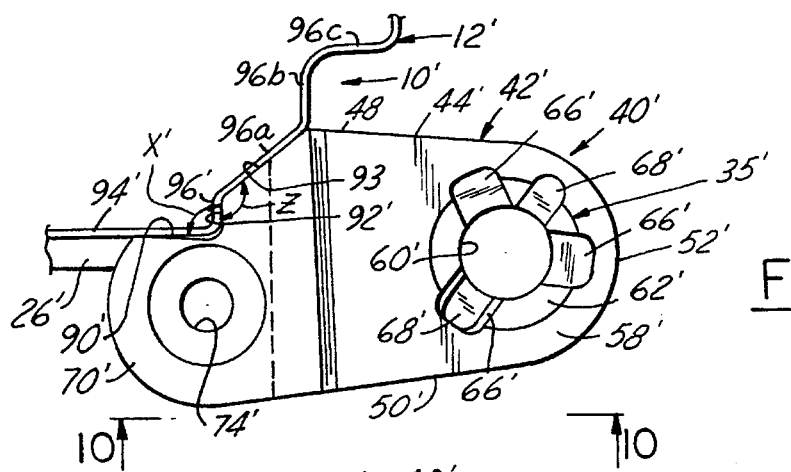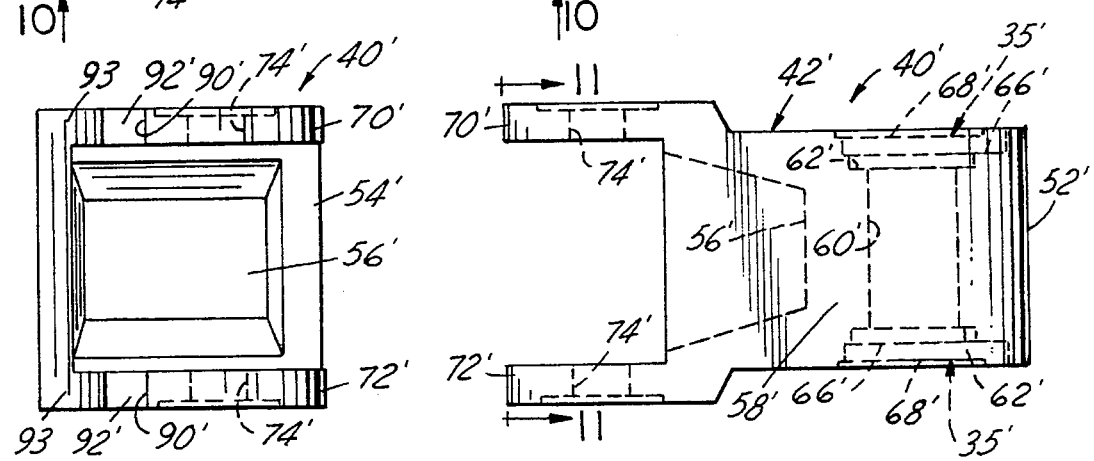

5,516,073

VEHICLE OUTSIDE MIRROR ATTACHING ARRANGEMENT

BACKGROUND OF THE INVENTION

This invention relates to a mounting arrangement for a vehicle exterior rear view mirror and more particularly to a support bracket for mounting a rear view mirror directly on a body-half hinge plate of the vehicle.

In certain types of sport utility vehicles, such as the Jeep Wrangler for example, the front doors are adapted for ready removal during off-road driving or the like. Current outside mirrors for such Jeep vehicles have their mounting brackets attached to the door-half hinge plate of the front doors. As a result when the front doors are removed the left hand and right hand exterior original equipment mirrors and their associated mounting brackets are also gone.

Various prior art arrangements have been proposed for mounting outside add-on mirrors on vehicle body surfaces such as doors, fenders etc. An example of one such arrangement is shown in U.S. Pat. No. 5,316,257 issued May 31, 1934 to Schmidt et al. wherein a separate bracket is required to support the mirror shaft clamp or clamps.

With reference to prior art FIG. 1 the left side of a Jeep Wrangler sport utility vehicle is partially depicted at 10. The vehicle left hand side front door 11 is shown mounted on vehicle body 12 by means of upper 14 and lower 16 hinge assemblies with the upper hinge assembly adapted to support an exterior side-view mirror generally indicated at 18. It will be noted that the upper 20 and lower 21 door-half hinge plates are fixedly attached to their associated upper 22 and lower 24 hinge pins. Accordingly, upon the removal of securing fasteners (not shown) on the lower end of the upper pin 22 the door 11 is lifted off the body 12. Thus, as seen in FIG. 1, upper and lower body-half hinge plates 26 and 28 respectively, and their associated apertured knuckles 57 and 29 remain fixed on the body.

Applicant's invention involves providing a one-piece bracket uniquely adapted for ready assembly on the upper body-half hinge plate knuckle 27. The one-piece bracket is designed with upper and lower vertically spaced flanges, formed with upper and lower aligned holes, for attachment to the body-half hinge plate knuckle 27 by means of a standard threaded hex head bolt, spacing washer and nut.

SUMMARY OF THE INVENTION

It is a feature of the present invention to provide an exterior rear view mirror mounting bracket adapted for self-aligned attachment to an existing vehicle front door upper body-half hinge plate knuckle where the vehicle front door has been removed.

It is another feature of the present invention to provide an exterior mirror mounting bracket for ready left or right side mounting an original equipment rear view mirror in the field without modification thereof wherein fewer parts and reduced labor, time and tools are required.

It is still another feature of the present invention to provide a one-piece exterior mirror bracket as set forth above requiring only a single standard threaded bolt, washer and nut.

It is a still further feature of the present invention to provide an exterior mirror bracket as set forth above which is "unhanded" enabling one bracket to be used to mount either a left hand or a right hand exterior rear view mirror.

BRIEF DESCRIPTION OF THE DRAWINGS

These and other objects, features and advantages of the present invention will appear from the following written description and the accompanying drawings in which:

FIG. 1 is a fragmentary perspective view of an original equipment exterior rear view mirror supported on a vehicle door by means of a conventional mounting arrangement;

FIG. 1A is a fragmentary perspective view of a modified original equipment mirror interlocking fitting arrangement;

FIG. 2 is a fragmentary perspective view of the vehicle of FIG. 1 showing the left side door removed and the rear view mirror mounted on the existing body-half hinge plate by means of a mirror mounting bracket in accordance with the present invention;

FIG. 3 is a fragmentary vertical sectional view, partly in elevation, taken on the line 3—3 of FIG. 2;

FIG. 3A is a fragmentary vertical sectional view taken on the line 3A—3A of FIG. 3;

FIG. 4 is a fragmentary exploded perspective view of the vehicle upper body-half hinge plate and mirror mounting bracket of the present invention;

FIG. 5 is a fragmentary exploded perspective view of a conventional rear view mirror mounting stem of one type adapted for reception in the bracket housing mating upper bore;

FIG. 6 is a detail side view of one form of mirror mounting bracket in accordance with the present invention;

FIG. 7 is a detail top view of the mirror mounting bracket of FIG. 6;

FIG. 8 is a vertical cross-sectional view taken on the line 8—8 of FIG.

FIG. 9 is a fragmentary vertical sectional view, partly in elevation, of a second embodiment of the bracket for a modified vehicle design showing the left side door removed and a rear view mirror assembly mounted on the existing body-half hinge plate by means of a modified mirror mounting bracket in accordance with the present invention;

FIG. 10 is a detail side view of the modified mirror mounting bracket taken on line 10—10 of FIG. 9; and FIG. 11 is a vertical sectional view taken on the line 11—11 of FIG. 10.

DETAILED DESCRIPTION OF THE PREFERRED EMBODIMENT

Referring now to the drawings the left side of a conventional Jeep Wrangler sport utility vehicle is partially depicted at 10 in FIG. 1 wherein a left hand side door 11 is shown supported on the vehicle body 12 by upper 14 and lower 16 door hinge assemblies. The door 11 is provided with an exterior original equipment rear view mirror assembly 17 comprising a head portion 18 pivotally supported on a radially extending arm 18a, removably supported by a holder portion or base 19. The door has an upper door-half hinge plate 20 and a lower door-half hinge plate 21 are each fixed to the door by a plurality of bolts. The upper door-half hinge plate 20 together with its mirror holder portion 19 constitute original equipment of the manufacturer and form no part of the present invention.

It will be appreciated that the left side door 11 is detached from the vehicle body 12 by un-threading an upper hinge pin securing nut (not shown). It will be noted that the upper 20 and lower 21 door-half hinge plates are fixedly attached to their associated upper 22 and lower 24 hinge pins. Consequently, upon lifting the door vertically the upper and lower hinge pins are removed from their associated body-half hinge knuckles. As seen in FIG. 2 upon the door 11 being detached, together with its upper and lower door-half hinge plates 20 and 21, its upper body-half hinge plate 26 remains fixed on the body providing a free upper knuckle 27. FIG. 2 shows lower body-half hinge plate 28 providing a free lower knuckle 29 in the same manner as the upper body-half hinge plate 26 and knuckle 27.

With reference to FIG. 1A it will be seen that the original equipment mirror assembly 17 has an attaching stem 30, extending from the base of its holder arm 18a, which stem is inserted in a slip fit manner in a through bore (not shown) of the conventional upper door-half hinge mirror stem holder 19 (FIG. 1). An interlocking fitting arrangement, consisting of a male-half connector 31 provided on the underside of the mirror arm 18a, is designed to interlock with a female half connector (not shown) formed in the upper surface of the mirror holder 19 (FIG. 1).

The male-half connector 31 of FIG. 1A comprises three equally spaced radially extending keys 32, with only two of the three keys 32 being visible. The door-half hinge holder portion 19 has a mating female-half connector, (not shown) of the type disclosed generally at 35 in FIG. 7, comprising three complementary keyways extending radially from a central stem receiving through bore. The female-half connector keyways are adapted to interlock with associated male-half connector keys 32. As a result the mirror assembly 17 is correctly oriented upon its stem 30 being received in the holder through bore and held by a nut 33 threaded on the stem free end.

It will be noted in FIG. 5 that the mirror assembly 17 may have an alternative fitting arrangement comprising a pair of diametrically opposed radially extending keys 34 formed at the base of the mirror stem 30. The mirror fitting arrangements of FIGS. 1A and 5 will be discussed in detail below.

With reference to FIGS. 3 and 3A a doors-off one piece mirror attaching bracket is shown generally at 40. The bracket 40 comprises a generally rectangular-shaped housing 42 defined by upper and lower parallel faces 44 and 46, respectively. The housing 42 is further defined by a pair of side faces 48 and 50 shown in FIG. 3 diverging from a rounded end wall 52 at one closed distal end of the block.

The perspective view of FIG. 5 shows the housing having a rectangular-shaped open end 54 terminating in an internal backwall 56 defining a block portion 58 (FIG. 6) at the housing opposite end. It will be seen in FIGS. 6 and 7 that the block portion 42 has a vertically disposed through bore 60 adapted to receive the mirror assembly stem 30.

As seen in FIGS. 7 and 8 the through bore 60 has a countersunk or offset face 62 in each upper 44 and lower 46 housing surface. Each upper and lower offset face 62 and 64 respectively is formed with the a female-half connector 35 of the interlocking fitting arrangement. As best seen in FIG. 7 three radially extending uniformly spaced wide keyways 66 of the female-half connector 35 are adapted to interlock with an associated mirror stem base male-half connector 31 (FIG. 1A) comprising the keys 32. It will be noted in FIG. 7 that the female-half connector 35 is also formed with a pair of diametrically opposed radially extending keyways 68 adapted to receive in an interlocking fashion an associated mirror stem base key shown at 34 in modified male-half connector 65 of FIG. 5. Thus, when the mirror assembly three keys 32 or pair of keys 34 are inserted in their respective matching three keyways 66 or pair of keyways 68 the mirror assembly 17 is correctly oriented in a predetermined manner by the bracket 40.

The bracket proximate mounting end has upper 70 and lower 72 mounting flanges formed with upper and lower aligned holes 74 and 76, respectively. It will be noted that while the attaching bracket 40 is shown adapted for mounting a left hand side rear view mirror the block is "unhanded" that it can be used to mount a right hand mirror. Thus, as seen in FIG. 6 the bracket 40 is symmetrical about a longitudinal plane of symmetry which includes construction line "S".

As seen in FIG. 3A the flanges 70 and 72 have opposed internal faces 78 and 80 vertically spaced a predetermined dimension "D" therebetween. The dimension "D" slightly exceeds the height of the body-half hinge plate knuckle 27 enabling the flanges 70 and 72 to seat on upper and lower ends 82 and 84 respectively, of their associated knuckle 27.

With reference to FIG. 7 it will be seen that each of the mounting flanges 70 and 72 have their inboard ends formed with vertically aligned angular engaging notches. Each of the notches is defined by a pair of first longitudinal notch edges 90 and second transverse V-shaped notch edges 92 defining a predetermined internal angle "X". In the disclosed embodiment the angle "X" is an acute angle of substantially 85 degrees. It will be seen in FIG. 4 that upon the upper 70 and lower 72 flanges having their inner surfaces 78 and 80 being seated on respective upper and lower ends 42 and 44 of the body-half hinge plate knuckle 27 each first notch edge 90 is adapted for flush contact with an exterior surface of vehicle body part in the form of exterior side panel 94. At the same time the second notch edge 92 is adapted for flush contact with an opposed body door jamb portion in the form of door jamb transverse face 96. It will be seen in FIG. 3 that the notch interior angle "X" (FIG. 3) mates with body exterior angle "Y" defined by the panel outer surface 97 and the door jamb exterior surface 98. In the disclosed embodiment the obtuse angle "Y" is substantially 275 degrees.

Upon tightening hex head bolt 99 on bolt 93 the resultant clamping force causes the upper 70 and lower 72 flanges to be urged into clamping engagement with the associated upper and lower ends 82 and 84 of the knuckle 27.

With reference to FIGS. 9–11 a modified form of mounting bracket is shown for attachment to an alternative vehicle body configuration. In the description of the modified bracket the same reference numerals in FIGS. 1–8 will be used in FIGS. 9–11 for like or corresponding elements except that they will be primed.

FIG. 9 shows a vehicle 10' with the vehicle body 12' having a left side exterior panel 94' terminating at its aft end in a door jamb transversely extending outer face 96' having its inboard end joined by an inwardly and rearwardly extending oblique face portion 96a. The oblique face portion terminating in a transverse inner face portion 96b and a longitudinally extending jamb portion 96c.

A modified mounting bracket 40' has a housing block 42' substantially identical to the block 42 of FIG. 3. It will be noted in FIGS. 9 and 11 that the upper 70' and lower 72' flanges have their inboard ends formed with vertically aligned internal-angled engaging notches. Each of the internal-angled notches is defined by a pair of first 90' and second 92' notch edges defining a predetermined notch angle "X'". In the second embodiment of FIGS. 9–11 the acute angle "X'" is substantially 85 degrees, i.e. substantially the same as the angle "X" of the first embodiment.

With reference to FIGS. 3 and 9 it will be appreciated that because the bracket 40' has the same notch angle "X'" as the bracket 40 notch angle "X" the bracket 40' is adapted for interchangeable use with either the vehicle body 12 or the vehicle body 12'. FIG. 9 shows the body side or longitudinal panel 94' and door jamb transverse face 96' define an angle of substantially 90 degrees while the internal notch angle "X'" is substantially 85 degrees. As a result the notch edges 90' and 92' are not in flush contact with their associated body panel 94' and door jamb transverse surface 96'. The modified bracket provides interlocking externally angled surfaces enabling the single bracket 40' to be used with either vehicle body 12 or 12'.

As seen in FIG. 9 the bracket 40' external angled sawtooth notch provides upper and lower vertically aligned laterally extending edges 93 which intersect their associated upper and lower oblique notch edges 92' at a predetermined obtuse external angle "Z" of the order of 125 degrees. The external obtuse angle "Z" defies a saw-tooth notch designed to match the obtuse internal body angle defined by the intersection of the jamb portions 96' and 96a. It will be understood that the resulting flush contact between the jamb faces 96' and 96A and the corresponding notch edges 92' and 93 provides sufficient positive interlock of the bracket 40' with the vehicle body 12' to thereby insure fixed engagement between the bracket 40' and the vehicle 12'.

While the principles of the invention in connection with the specific apparatus has been described, it is to be understood that the foregoing detailed descriptions have been made by way of examples only and not as a limitation to the scope of the invention as set forth in the accompanying claims.

What is claimed is:

1. In a vehicle body having a side door with door-half hinge plates adapted for detachment from their associated body-half hinge plate upon removal of their associated hinge pins, an upper door-half hinge plate providing a body hinge knuckle with a through bore aligned on a hinge axis, first and second external body portions intersecting at a vertically extending juncture defining a predetermined exterior angle, and a bracket including means for receiving a mounting stem of an exterior rear view mirror assembly, the bracket adapted for removable attachment to the vehicle body, the bracket comprising:

a one-piece bracket defining an elongated housing having one end formed with upper and lower flanges providing upper and lower aligned holes respectively, a housing opposite end having a vertically extending through bore the upper end of which is formed with fitting means, said flanges having opposed internal faces spaced a determined vertical dimension therebetween slightly larger than the dimension between upper and lower ends of the knuckle;

said pair of flanges each formed with vertically aligned first and second notch means, each said notch means having first and second intersecting edges defining a predetermined angle, whereby with each said flange face abutting an associated knuckle end and said first and second notch means edges contacting an associated first and second body surface portion said holes aligned with the through bore, such that with fastener means received in said holes and through bore said bracket being fixedly positioned on the vehicle body; and whereby with the mirror assembly mounting stem being received through said bracket other end bore, and wherein said bracket having an upper surface thereof provided with fitting means adapted for engagement with complementary fitting means on an opposed surface of the mirror assembly thereby positioning the mirror assembly at a predetermined orientation on the vehicle.

2. The mirror mounting bracket as set forth in claim 1 wherein said bracket other end bore upper and lower surfaces each provided with mirror image fitting means whereby said bracket, upon being inverted, is adapted for attachment to an opposite body side door upper door-half hinge plate knuckle.

3. The mirror mounting bracket as set forth in claim 1 wherein each said upper and lower notch means comprising an internal V-shaped cut in notch having first and second intersecting edges defining an acute angle, and wherein each said notch first edge contacting a vehicle exterior body surface and each said notch second edge contacting a vehicle door jamb part.

4. The mirror mounting bracket as set forth in claim 3 wherein said first edge extending generally longitudinally and said second edge extending generally transversely, whereby said internal acute angle of the order of 85 degrees.

5. The mirror mounting bracket as set forth in claim 1 wherein each said upper and lower notch means comprising an external saw-tooth shaped protruding notch having first and second intersecting edges defining an obtuse angle, and wherein said external notch first edge extending generally transversely and said external notch second edge extending obliquely, and whereby each said external notch first and second edges contacting complementary vehicle door jamb surface portions.

6. The mirror mounting arrangement as set forth in claim 5 wherein said upper and lower external notch defining said obtuse angle of the order of 125 degrees.

\* \* \* \* \*